Patented Feb. 12, 1952

2,585,616

UNITED STATES PATENT OFFICE 2,585,616

PROCESS OF PICKLING METALS

Marion D. Barnes, New York, N. Y., assignor to Sparex Chemical Company, a partnership No Drawing. Application August 9, 1946, Serial No. 689,525

2 Claims. (Cl. 134—3)

This invention relates to a process of pickling metals.

The invention is particularly useful in removing ferric oxide scale from iron, that is pickling iron and steel products and for that reason will be illustrated in detail by description in connection with such use.

In the making of iron and steel products, it is customary to remove the scale by dipping the products in a solution of a pickling acid or acidic material of which sulfuric acid, sodium bisulfate, hydrochloric acid, and phosphoric acid are examples, the pickling material being in the form of a rather dilute aqueous solution. As the scale is dissolved away, the clean metal is exposed.

The scale on iron includes ordinarily ferric oxide, magnetic oxide, and some ferrous oxide. It is commonly understood that the outer layer of the scale contains iron in the ferric state, either as $Fe_2O_3$ or $Fe_3O_4$. A layer of ferrous oxide occurs below the ferric layer and in direct contact with the metal itself. It is further considered that, in pickling, the pickling acid penetrates through the outer layer of scale including one of the ferric oxides and first dissolves the undercoating layer of ferrous oxide. When this undercoating dissolves, the outer layer of scale sloughs off, the loosening of this outer or ferric scale being promoted also by hydrogen gas generated by attack of the acid upon the metal itself.

The explanation of the failure of the ferric scale itself to dissolve promptly on contact with the pickling acid is the relatively great insolubility of ferric oxide in water. This insolubility restricts the rate at which hydroxyl ions are made available for being neutralized by the hydrogen ions of the acid. It is only as the OH ions are neutralized and thus removed, that more ferric ions dissolve without causing the product of the concentrations of the ferric and hydroxyl ions to exceed the very low solubility product for $Fe(OH)_3$.

Regardless of the exact mechanism involved, it is a fact that the relatively slow rate of solution of the ferric scale in pickling acid delays the speed of pickling and thus extends the time required to produce the desired clean surface on the metal. This means that there is not only loss of time but also a longer period during which the pickling acid acts upon and dissolves away unnecessary proportions of the metal itself. It has been estimated, for instance, that approximately 60 pounds of iron per ton is dissolved on the average when iron or steel products are pickled.

A further difficulty arises in pickling with the usual process and composition. As the ferrous ion concentration builds up in the pickling liquor, the rate of further pickling decreases. At concentrations of 18% or so of ferrous ion, calculated as ferrous sulfate in the pickling liquor, the rate of pickling becomes too slow in fact to be commercially satisfactory even though there may be left as much as 5% of free sulfuric acid in the bath.

The present invention provides a method of accelerating the solution of the ferric oxide scale without depending upon the loosening of it by generation of hydrogen accompanying solution of the metal itself and without waiting for the normally more soluble undercoating of ferrous oxide to be dissolved away first. The invention provides also for limiting the concentration of ferrous ion as it appears in solution in the pickling bath, so as to avoid such concentration of it as to have appreciable reversing or slowing down effect upon the pickling process.

I accomplish these results in accordance with the present invention by introducing into the pickling acid a reagent that maintains the concentration of ferric ion at an extremely low level at all times and also places a maximum upon the concentration to which the ferrous ion builds up in the pickling bath, the reagent added being oxalic acid.

With ferric ion the oxalic acid forms a complex which makes the concentration of free ferric ion equal to zero for all practical purposes.

Since the product of the concentration of the hydroxyl ion and ferric ion at saturation is a constant under a given set of conditions, then making the ferric ion concentration practically zero means that there is unsaturation with respect to ferric hydroxide and therefore very little hindrance to the dissolving of ferric hydroxide.

Then as the scale dissolves and ferrous ion begins to build up in the pickling bath, the oxalic acid causes the formation of ferrous oxalate which has only a low solubility in the dilute pickling acid of the kind described herein, the term pickling acid being used to include such acidic pickling material as sodium bisulfate.

As a result of these effects of the oxalic acid in the pickling solution, there is speeding up of the rate of dissolving of the ferric scale, with no corresponding increase in the rate of dissolving of the iron itself in the solution, and therefore a decrease in the amount of actual metal dissolved. There is also a lengthening of life of the pickling bath in that there is no building up of ferrous ions in the bath to such concentration as to cause the reaction to approach equilibrium sufficiently closely to make the rate of pickling commercially unsatisfactory.

The use of the oxalic acid in conjunction with the pickling acid also has the advantage of converting the bulk of the iron dissolved, namely, the ferrous iron to the form of a precipitate which may be readily removed from the pickling bath and regenerated to give a fresh supply of oxalic acid for reuse in the process. This avoids the difficulty previously experienced in disposing of pickling baths that have reached the inactive stage without acidifying the water or soil into which the acid bath is discharged.

As the inorganic pickling acid in my composition I use one of those that is conventional for pickling iron and steel, as, for example, one of those listed above.

The selected pickling acid is used in about the proportion in which the material is commonly employed for pickling. Thus, I may use to advantage 5 to 10 parts of sulfuric, hydrochloric, or phosphoric acid or 15 to 30 parts of niter cake (commercial sodium bisulfate) for 100 parts of the pickling solution.

The oxalic acid is used by me in the proportion of about 2 to 10 parts and for best results within the range 4 to 10 parts for 100 parts of the solution, any oxalic acid above the proportion required for saturation, remaining undissolved. The part of the solution not accounted for by the inorganic acidic material and the oxalic acid is principally water, all proportions here and elsewhere herein being expressed as parts by weight.

There may be added small amounts of ingredients that are usual in pickling baths, to replace a part of the water in the above formula, as, for instance, an acid inhibitor to retard the rate of dissolving of metal by the pickling bath and also a wetting agent. I use preferably both an inhibitor and a wetting agent, any that are conventional in pickling iron being satisfactory.

In any case, the formula contains oxalic acid in proportion not substantially in excess of the inorganic acid.

The inorganic acidic materials may be used separately or mixed with each other. I have found no particular advantage, however, in such mixture and prefer to use only one of the inorganic acidic materials in order to simplify regeneration and fortification problems as well as to simplify handling and storage of materials in commercial operations.

When niter cake is used as the pickling acid, the proportion of oxalic acid that dissolves is limited to a maximum that is desirable in the operation. This gives the advantage that, with niter cake as the inorganic acidic material, the concentration of oxalic acid may be controlled at the desired level by throwing into the bath an excess of oxalic acid which dissolves only as required to maintain the saturation proportion wanted for good results in pickling. Thus, in the presence of dissolved niter cake of concentration 20 to 30 parts for 100 parts of the pickling solution, the maximum amount of oxalic acid that will dissolve is about 3 to 5 parts for 100 parts of the solution, at the most only about half the amount that will dissolve in the absence of the niter cake at the same room temperature.

The invention will be further illustrated by description in connection with the following specific examples.

*Example 1*

A pickling solution is prepared by dissolving niter cake in solution until the specific gravity of the solution becomes 1.25. This corresponds to a proportion of dissolved substance of about 28–30%. Oxalic acid is then added until some of it remains undissolved on standing. An aryl sulfonic acid in amount corresponding to 0.1% of the solution and an equal amount of a quaternary ammonium salt are added to the solution, to serve as wetting agent and inhibitor, respectively.

Iron pipe having a coating of ferric scale or rust is immersed in this bath until clean, after which the pipe is removed and rinsed with water to remove adhering sulfate.

When additional sections of the pipe are immersed and the process repeated a large number of times, the iron in solution builds up to the point at which ferrous oxalate precipitates. This precipitation occurs, the bath still remains active.

This operation is continued until tests made at intervals show a sharp rise in concentration of iron in the pickling solution or bath. When this condition is noted, then more oxalic acid is shoveled into the bath and the pickling as described continued.

The ferrous oxalate that collects at the bottom of the bath is then removed. On a large scale, it is suitably removed continuously by draining solution and ferrous oxalate from the bottom of the tank, filtering the suspension, and returning the filtrate to the pickling tank.

*Example 2*

The procedure of Example 1 is followed except that sulfuric, phosphoric or hydrochloric acid, in the proportion of 5 to 10 parts for 100 parts by weight of the pickling solution, is substituted for the niter cake of Example 1.

The rate of dissolving of the rust on the pipe in contact with the pickling bath of Example 1, for instance, is about twice as great as the rate of dissolving under conditions that are comparable except for the absence of the oxalic acid. The resulting surface is clean and free from objectionably pitted areas.

It will be understood also that it is intended to cover all changes and modifications of the examples of the invention herein chosen for the purpose of illustration which do not constitute departures from the spirit and scope of the invention.

What I claim is:

1. The method of pickling iron which comprises contacting the iron and scale thereon with an aqueous solution of acidic material consisting essentially of sodium bisulfate and oxalic acid in contact with solid oxalic acid in excess of the amount soluble in the solution and maintaining the contact of the scale with crystals of the latter in excess of the amount soluble in the solution until the scale is dissolved.

2. The method of removing ferric oxide scale from iron which comprises contacting the iron and scale thereon with an aqueous solution of acidic material consisting essentially of oxalic acid and an acidic ingredient selected from the group consisting of sulfuric acid, sodium bisulfate and hydrochloric acid, maintaining the contact of the scale with the solution until the scale is dissolved and separating from the solution the resulting precipitate of ferrous oxalate, the proportion of oxalic acid being maintained at approximately that required to saturate the solution and the said acidic ingredient being present in proportion at least equal to the amount of oxalic acid.

MARION D. BARNES.

REFERENCES CITED

The following references are of record in the file of this patent:

UNITED STATES PATENTS

| Number | Name | Date |
|---|---|---|
| 133,095 | Haggett | Nov. 19, 1872 |
| 145,971 | Sawyer | Dec. 30, 1873 |
| 370,551 | McCarthy | Sept. 27, 1887 |
| 2,049,517 | Saukaitis | Aug. 4, 1936 |
| 2,261,700 | Ryznar | Nov. 4, 1941 |
| 2,422,066 | Bacon | June 10, 1947 |
| 2,423,385 | Hixson | July 1, 1947 |